United States Patent
Gatson et al.

(10) Patent No.: US 11,593,670 B2
(45) Date of Patent: Feb. 28, 2023

(54) SYSTEM AND METHOD FOR MANAGING A FLOW STATE OF A USER OF AN INFORMATION HANDLING SYSTEM

(71) Applicant: Dell Products L.P., Round Rock, TX (US)

(72) Inventors: Michael S. Gatson, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 16/741,871

(22) Filed: Jan. 14, 2020

(65) Prior Publication Data

US 2021/0216888 A1 Jul. 15, 2021

(51) Int. Cl.
| | |
|---|---|
| G06F 3/048 | (2013.01) |
| G06N 5/025 | (2023.01) |
| G06F 9/48 | (2006.01) |
| H04L 41/12 | (2022.01) |
| G06F 3/01 | (2006.01) |
| G06F 3/16 | (2006.01) |
| G06F 9/4401 | (2018.01) |

(52) U.S. Cl.
CPC ............ *G06N 5/025* (2013.01); *G06F 3/013* (2013.01); *G06F 3/16* (2013.01); *G06F 9/4418* (2013.01); *G06F 9/4881* (2013.01); *H04L 41/12* (2013.01)

(58) Field of Classification Search
CPC ........... G06N 5/025; G06F 3/013; G06F 3/16; G06F 9/4418; G06F 9/4881
See application file for complete search history.

(56) References Cited

U.S. PATENT DOCUMENTS

| | | | | |
|---|---|---|---|---|
| 9,866,916 | B1* | 1/2018 | Boss | H04N 21/41415 |
| 10,365,716 | B2* | 7/2019 | Aimone | A61B 5/378 |
| 10,842,430 | B1* | 11/2020 | Novelli | A61B 3/113 |
| 11,016,656 | B1* | 5/2021 | Covell | G06T 7/20 |
| 11,249,544 | B2* | 2/2022 | Sicconi | G08B 3/1016 |
| 11,489,852 | B2* | 11/2022 | Coltel | H04L 67/1095 |

(Continued)

OTHER PUBLICATIONS

Peterson, Christopher (May 16, 2008). "What Is Positive Psychology, and What Is It Not?". Psychology Today. May 16, 2018.

(Continued)

*Primary Examiner* — David Phantana-angkool
(74) *Attorney, Agent, or Firm* — McDermott Will & Emery LLP

(57) ABSTRACT

Systems and methods are disclosed for managing flow state of a user of an information handling system that may include receiving, by a rules engine of the information handling system, contextual input associated with the user, the contextual input captured by one or more monitoring devices of the information handling system; determining, based on the contextual input, a user intent associated with the user, the user intent indicating whether the user intends to be in the flow state or in a distracted state; identifying, based on the user intent, that the user intends to be in the flow state; and in response to identifying that the user intends to be in the flow state: causing a flow management event to occur, the flow management even causing the user to be in the flow state.

16 Claims, 3 Drawing Sheets

(56) References Cited

U.S. PATENT DOCUMENTS

| | | | | |
|---|---|---|---|---|
| 2009/0315869 | A1* | 12/2009 | Sugihara | G06F 1/1605 |
| | | | | 345/204 |
| 2013/0305322 | A1* | 11/2013 | Raleigh | H04L 12/1435 |
| | | | | 726/4 |
| 2016/0373588 | A1* | 12/2016 | Raleigh | H04L 12/1407 |
| 2017/0168703 | A1* | 6/2017 | Feris | G06F 3/013 |
| 2019/0260879 | A1* | 8/2019 | Raleigh | H04M 15/83 |
| 2019/0340817 | A1* | 11/2019 | Bostick | G06F 8/30 |
| 2020/0057487 | A1* | 2/2020 | Sicconi | G06T 7/254 |
| 2021/0169417 | A1* | 6/2021 | Burton | A61B 5/02055 |
| 2021/0191792 | A1* | 6/2021 | Gatson | G06F 3/011 |
| 2021/0216888 | A1* | 7/2021 | Gatson | G06N 5/025 |
| 2021/0281956 | A1* | 9/2021 | Nagar | H04R 3/005 |
| 2021/0309252 | A1* | 10/2021 | Boulanger | G06F 3/015 |
| 2021/0350624 | A1* | 11/2021 | Komp | G02B 27/0093 |

OTHER PUBLICATIONS

Mihaly Csikszentmihályi (1990). Flow: The Psychology of Optimal Experience. Harper & Row. ISBN 978-0-06-016253-5.

\* cited by examiner

SYSTEM AND METHOD FOR MANAGING A FLOW STATE OF A USER OF AN INFORMATION HANDLING SYSTEM

BACKGROUND

Field of the Disclosure

The disclosure relates generally to information handling systems, and in particular to a system and method for managing a flow state of a user of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for managing a flow state of a user of an information handling system may include: receiving, by a rules engine of the information handling system, contextual input associated with the user, the contextual input captured by one or more monitoring devices of the information handling system; determining, based on the contextual input, a user intent associated with the user, the user intent indicating whether the user intends to be in the flow state or in a distracted state; identifying, based on the user intent, that the user intends to be in the flow state; and in response to identifying that the user intends to be in the flow state: causing a flow management event to occur, the flow management event causing the user to be in the flow state.

In one or more of the disclosed embodiments, determining the user intent associated with the user comprises: determining, by the rules engine, a hysteresis period based on the contextual input associated with the user, the hysteresis period indicating a length of time in which the rules engine is to monitor the contextual input associated with the user; monitoring the contextual input associated with the user based on the hysteresis period.

In one or more of the disclosed embodiments, determining the user intent associated with the user comprises: accessing, by the rules engine, one or more images of the user captured by an image sensor of the information handling system; determining that a gaze of the user is not directed toward the information handling system; and causing the user intent associated with the user to indicate that the user is in the distracted state.

In one or more of the disclosed embodiments, the method further comprises: determining, by the rules engine, that the gaze of the user is directed toward the information handling system; and causing the user intent associated with the user to indicate that the user is in the flow state.

In one or more of the disclosed embodiments, determining the user intent associated with the user comprises: accessing, by the rules engine, an audio stream captured by an audio sensor of the information handling system; determining that the audio stream includes an ambient noise causing the user to be in the distracted state; and causing the user intent associated with the user to indicate that the user is in the distracted state.

In one or more of the disclosed embodiments, the method further comprises: determining, by the rules engine, that the audio stream does not include the ambient noise causing the user to be in the distracted state; and causing the user intent associated with the user to indicate that the user is in the flow state.

In one or more of the disclosed embodiments, determining the user intent associated with the user comprises: accessing, by the rules engine, a proximity signal captured by a proximity sensor of the information handling system; determining whether the user is within a threshold proximity to the information handling system based on the proximity signal; and in response to determining that the user is not within the threshold proximity to the information handling system, causing the user intent associated with the user to indicate that the user is in the distracted state.

In one or more of the disclosed embodiments, causing the flow management event to occur comprises: accessing, by the rules engine, a context database of the information handling system, the context database comprised of the contextual input associated with the user; determining, based on the contextual input, that a standby mode of the information handling system should be overridden, the standby mode causing the information handling system to be in a locked state, the locked state preventing the user from using the information handling system; and in response to determining that the standby mode of the information handling system should be overridden, overriding the standby mode to prevent the information handling system from being in the locked state.

In one or more of the disclosed embodiments, causing the flow management event to occur comprises: identifying, by the rules engine, a plurality of applications executing on the information handling system; determining, for each of the plurality of applications, an initial priority status indicating a priority in which an application of the plurality of applications is to be executed by the information handling system; accessing the contextual input captured by the one or more monitoring devices of the information handling system; determining, based on the contextual input, whether the initial priority status for the application of the plurality of applications should be upgraded or downgraded, an upgraded priority status indicating that the application is to be executed at a higher priority than the initial priority status, a downgraded priority status indicating that the application is to be executed at a lower priority than the initial priority status; and executing the application based on at least one of the initial priority status, the upgraded priority status, or the downgraded priority status.

In one or more of the disclosed embodiments, causing the flow management event to occur comprises: identifying, by the rules engine, a plurality of access points in a network; selecting an initial access point from the plurality of access points, the initial access point allowing the information handling system to become communicatively coupled to the network; accessing the contextual input captured by the one or more monitoring devices of the information handling system; determining, based on the contextual input, whether the initial access point should be upgraded or downgraded, an upgraded access point having a higher quality of service than the initial access point, a downgraded access point having a lower quality of service than the initial access point; and causing the information handling system to become communicatively coupled to the network using at least one of the initial access point, the upgraded access point, or the downgraded access point.

The details of one or more embodiments of the subject matter described in this specification are set forth in the accompanying drawings and the description below. Other potential features, aspects, and advantages of the subject matter will become apparent from the description, the drawings, and the claims.

Figure 1:
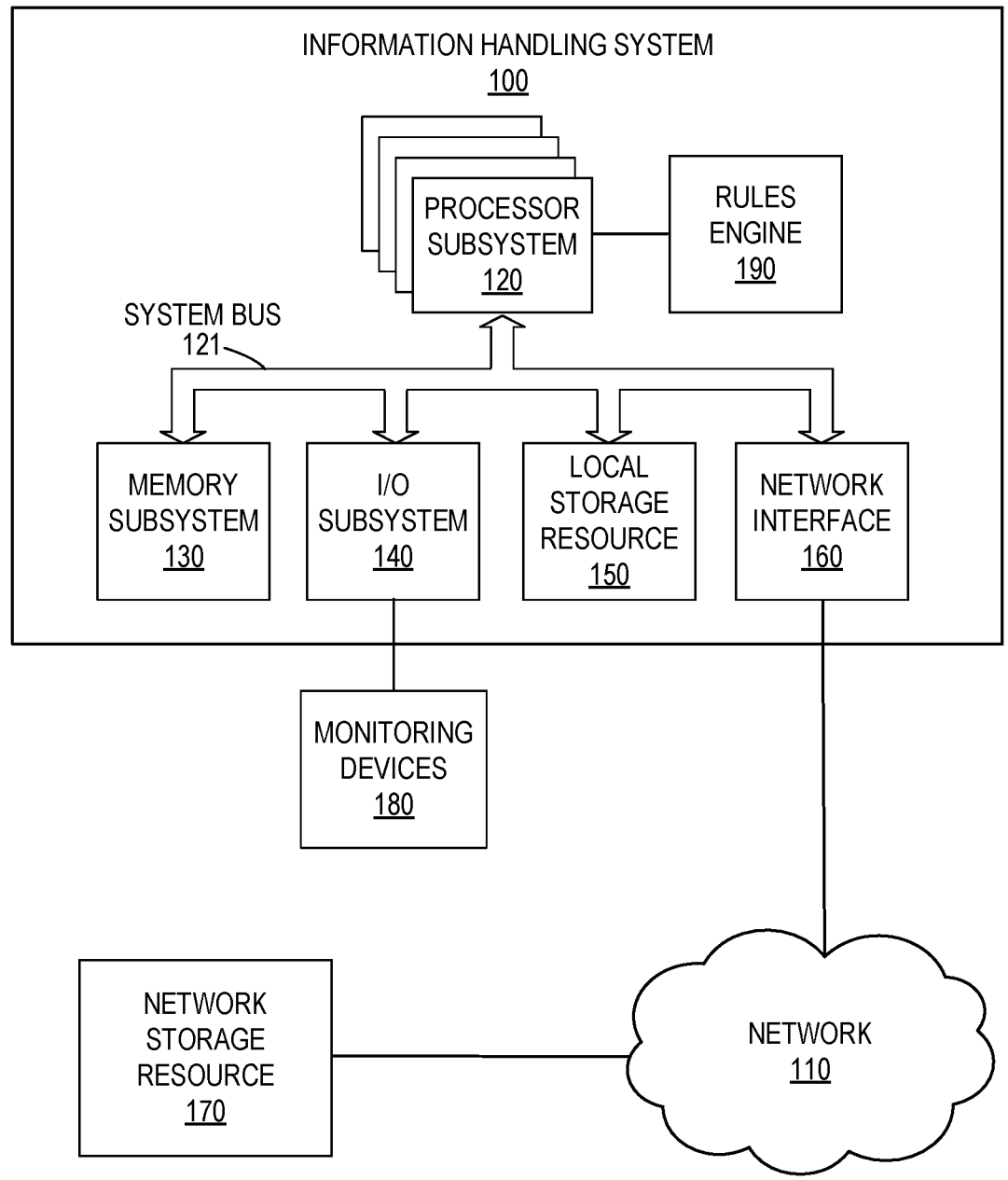
FIG. 1 is a block diagram of selected elements of an embodiment of an information handling system that includes a rules engine and a set of monitoring devices.

DESCRIPTION OF PARTICULAR
EMBODIMENT(S)

This document describes a method for managing information handling systems that may include: receiving, by a rules engine of the information handling system, contextual input associated with the user, the contextual input captured by one or more monitoring devices of the information handling system; determining, based on the contextual input, a user intent associated with the user, the user intent indicating whether the user intends to be in the flow state or in a distracted state; identifying, based on the user intent, that the user intends to be in the flow state; and in response to identifying that the user intends to be in the flow state: causing a flow management event to occur, the flow management event causing the user to be in the flow state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2A:
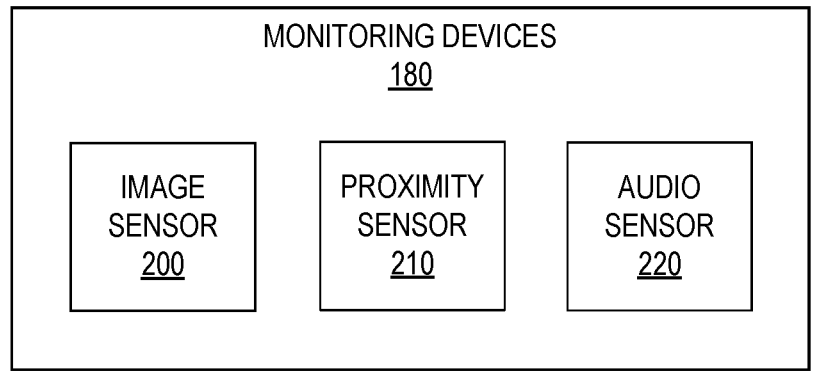
FIG. 2A is a block diagram of selected elements of an embodiment of a set of monitoring devices.
Figure 2B:
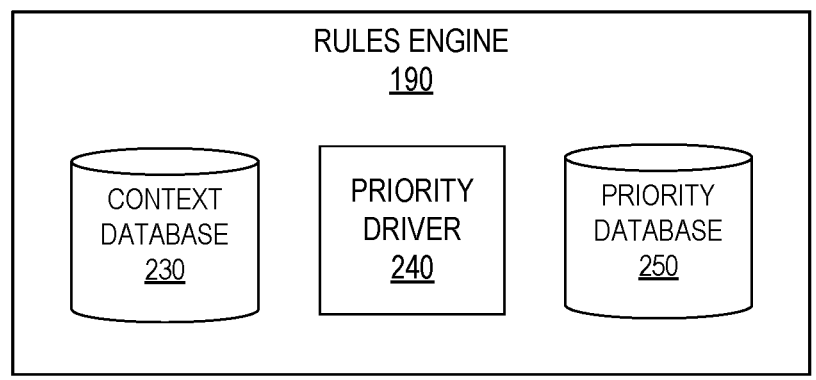
FIG. 2B is a block diagram of selected elements of an embodiment of a rules engine.
Figure 3:
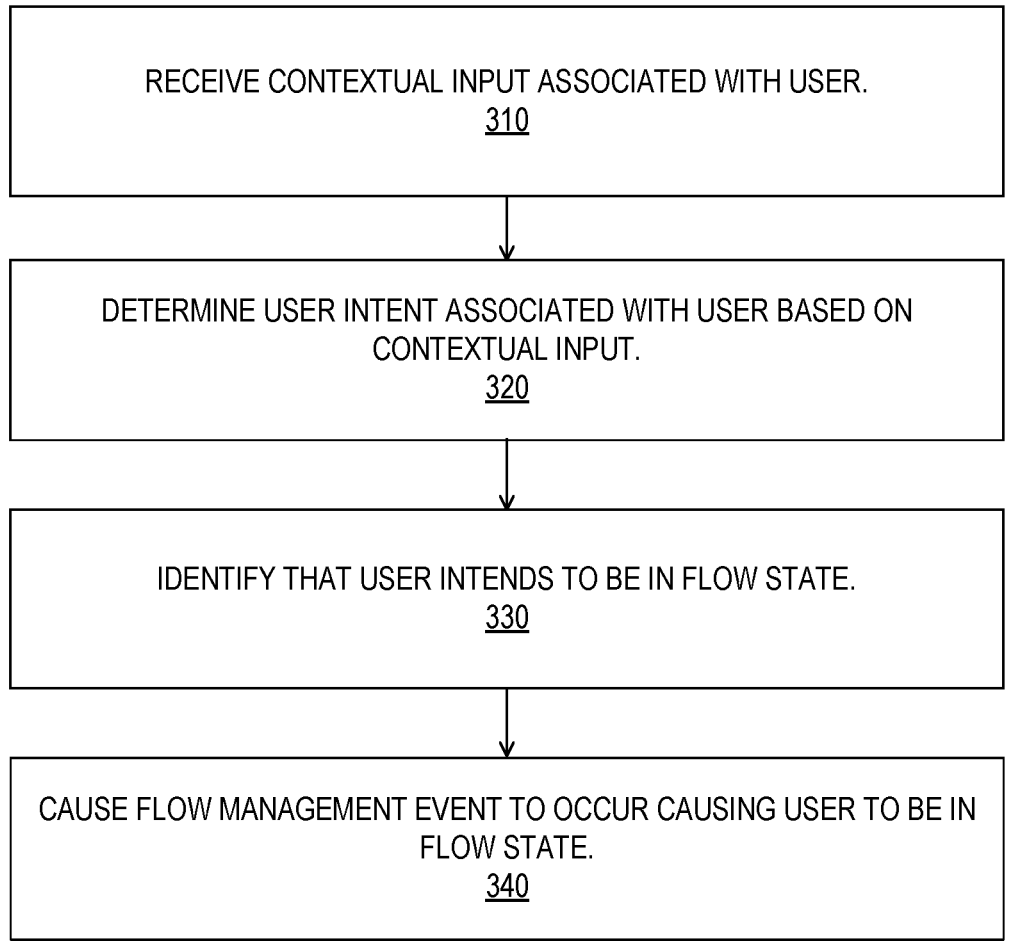
FIG. 3 is a flowchart depicting selected elements of an embodiment of a method for managing a flow state of a user of an information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140 communicatively coupled to monitoring devices 180, a rules engine 190, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

In one embodiment, monitoring devices 180 may capture image and/or audio data, or "contextual input," from a user of information handling system 100. The contextual input captured by monitoring devices 180 may be used to determine an intent for a user, or a "user intent," to complete one or more immediate tasks. Specifically, monitoring devices 180 may provide contextual input to rules engine 190 such that rules engine 190 may determine if the user intent is to complete one or more immediate tasks in a "flow state," or if the user is distracted from completing the one or more immediate tasks in a "distracted state." Monitoring devices 180 are described in further detail with respect to FIG. 2A.

In information handling system 100, rules engine 190 may comprise a system, device, or apparatus generally operable to determine a user intent of a user of information handling system 100. In particular, rules engine 190 may determine whether a user is in a flow state or in a distracted state based, in part, on contextual input captured by monitoring devices 180. The flow state of the user may indicate that the user is currently, or intends to be, focused on an immediate task such that the user's attention is not distracted by peripheral notifications or interferences. For example, a user may be in a flow state while drafting a document, presenting in a conference meeting, and/or completing various administrative duties. In contrast, the distracted state of the user may indicate that the user is currently distracted from focusing on an immediate task. For example, a user may be in a distracted state while having a personal conversation with a coworker, receiving a notification from a social media network, and/or answering a personal email. Rules engine 190 may use these contextual inputs captured by monitoring devices 180, alone or in combination, to determine the user intent of the user.

In one embodiment, rules engine 190 may cause one or more events, or "flow management events," that support a user establishing, or maintaining, a flow state. In particular, rules engine 190 may cause flow management events that eliminate distractions and interrupts and provide user performance enhancements to the user's environment. In one embodiment, flow management events can augment the environment of the user (e.g., ambient lighting, speaker volume, network settings, and the like) in support of the user being in a flow state. In response to determining a user intent indicating that a user of information handling system 100 intends to be in a distracted state, rules engine 190 may refrain from causing the flow management events to occur until the user is ready to work on one or more immediate tasks in a flow state. For example, if monitoring devices 180 capture one or more images of a user having a conversation with a coworker in the morning after the user arrives to work, rules engine 190 may refrain from causing a flow management event until the coworker has left and a gaze of the user becomes directed toward a display of information handling system 100. However, if rules engine 190 determines that a user is in a flow state, or intends to be in the flow state, rules engine 190 may cause one or more flow management events to occur that support the flow state. For example, if rules engine 190 determines that a user is in a flow state based on contextual input captured by monitoring devices 180, rules engine 190 may cause the ambient lighting in the environment of the user to dim to a level typically favored by the user while in the flow state. In one embodiment, rules engine 190 may store the contextual input associated with the user in the flow state to use as training data for a machine-learned model to generate a configuration policy specific to the user. Rules engine 190 may implement the configuration policy via flow management events in response to a user intent indicating that the user is, or intends to be, in the flow state. Rules engine 190 is described in further detail with respect to FIG. 2B.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

FIG. 2A is a block diagram of selected elements of an embodiment of a set of monitoring devices. In one embodiment, monitoring devices 180 may be used, in part, to determine a user intent. In particular, monitoring devices 180 may be used to capture contextual input from a user of information handling system 100. In another embodiment, monitoring devices 180 may be used in combination with other sources of contextual input (e.g., contextual input inferred from telemetry data associated with information handling system 100). In the embodiment illustrated in FIG. 2A, monitoring devices 180 may include an image sensor 200, a proximity sensor 210, and an audio sensor 220. In other embodiments, monitoring devices 180 may include additional, fewer, and/or any combination of monitoring devices and/or sensors suitable for capturing contextual input from a user to determine a user intent.

In one embodiment, image sensor 200 may comprise a system, device, or apparatus generally operable to capture one or more images of a user of information handling system 100. In particular, image sensor 200 may capture one or more images of an environment (e.g., office, workspace, cubicle, ambient lighting, time of day, and the like) of the user. These one or more images may be used for contextual input to determine, for example, if the user is currently seated in front of information handling system 100 working or away from information handling system 100 performing other tasks. In one embodiment, image sensor 200 may include facial recognition and/or eye-tracking capabilities such that image sensor 200 can determine if a gaze of the user is directed toward or away from information handling system 100. For example, if a user is focused on drafting a patent application and is seated in front of information handling system 100, image sensor 200 may capture images of the user seated in front of information handling system 100. Additionally, image sensor 200 may capture images of the gaze of the user directed toward a display of information handling system 100. These images captured by image sensor 200 may be used by rules engine 190, in part, to determine a user intent of the user. In one embodiment, image sensor 200 may be equipped with a standard complementary metal oxide semiconductor (CMOS) sensor through which color images of a user and/or user environment are acquired, for example, such as that of an RGB camera. In other embodiments, image sensor 200 may be or include a thermographic camera, infrared camera, and/or any combination of image sensors suitable for capturing one or more images of the user.

In one embodiment, proximity sensor 210 may comprise a system, device, or apparatus generally operable to identify if a user of information handling system 100 is close, or within a "threshold proximity," to information handling system 100. Specifically, proximity sensor 210 may emit a signal, or a "proximity signal," throughout an environment of the user to detect where the user is physically located within the environment. The proximity signal may be used as contextual input to determine if the user is within a threshold proximity to information handling system 100. For example, is a user is seated in front of information handling system 100, a proximity signal emitted from proximity sensor 210 may indicate that the user is within the threshold proximity to information handling system 100. In contrast, if the user leaves the area surrounding information handling system 100 to perform other tasks, the proximity signal may indicate that the user is no longer within the threshold proximity to information handling system 100. The proximity signal emitted by proximity sensor 210 may be used by rules engine 190, in part, to determine a user intent of the user. In one embodiment, proximity sensor 210 may be or include a Light Detection and Ranging (LIDAR) sensor. In other embodiments, proximity sensor 210 may be or include a Time of Flight (ToF) three-dimensional (3D) depth sensor, an ultrasonic sensor, and/or any combination of proximity sensors suitable for identifying if a user is within a threshold proximity to information handling system 100.

In one embodiment, audio sensor 220 may comprise a system, device, or apparatus generally operable to capture audio, or an "audio stream," of a user of information handling system 100. The audio stream captured by audio sensor 220 may be used as contextual input to determine a user intent of the user. For example, if a user is seated in front of information handling system 100, audio sensor 220 may capture an audio stream of the user working, such as sounds of the user typing on a keyboard and/or participating in a conference call via audio sensor 220. If the user leaves the area surrounding information handling system 100, the audio stream captured by audio sensor 220 may include ambient sounds of the environment of the user and/or the sounds of an empty room. In one embodiment, the audio stream captured by audio sensor 220 may be used, in part, by rules engine 190 to determine a user intent of the user. In another embodiment, the audio stream captured by audio sensor 220 may additionally be used, in part, by rules engine 190 to determine a connection quality (e.g., quality of bandwidth, audio/video resolution, bitrate, and the like) associated with information handling system 100. For example, rules engine 190 may access an audio stream captured by audio sensor 220 to determine if the connection quality of information handling system 100 is experiencing bandwidth and/or packet loss issues during a conference meeting. Here, connection quality may affect the user intent of the user, and/or other users, if the user becomes distracted due to poor connection quality. For example, if information handling system 100 is experiencing a poor connection quality, an audio stream captured by audio sensor 220 may include an ambient noise causing the user to be in the distracted state. In one embodiment, audio sensor 220 may be or include a dynamic microphone communicatively coupled to information handling system 100. In other embodiments, audio sensor 220 may be or include a microelectromechanical systems (MEMS) microphone, a dynamic universal serial bus (USB) microphone, and/or any combination of audio sensors suitable for capturing an audio stream of a user.

FIG. 2B is a block diagram of selected elements of an embodiment of a rules engine. Rules engine 190 may receive contextual input associated with a user of information handling system 100 and determine a user intent associated with the user based on the contextual input. In one embodiment, rules engine 190 may access contextual input captured by monitoring devices 180 to determine user intent. Specifically, rules engine 190 may monitor contextual input captured by monitoring devices 180 to determine if a user is currently in a flow state, if a user intends to be in a flow state, and/or if a user is in a distracted state. In another embodiment, rules engine 190 may use telemetry data associated with information handling system 100 as contextual input to determine user intent. For example, rules engine 190 may access calendar events, active foreground/background applications executing on information handling system 100, and/or keyboard/mouse activity to determine a user intent of the user. In other embodiments, rules engine 190 may use any suitable combination of contextual input captured by monitoring devices 180 and/or contextual input inferred from telemetry data to determine user intent. In response to identifying that user intent indicates that a user is, or intends to be, in a flow state, rules engine 190 may cause one or more flow management events to occur that promote the user being in a flow state. In the embodiment illustrated in FIG. 2B, rules engine may include a context database 230, a priority driver 240, and a priority database 250. In other embodiments, rules engine 190 may include additional, fewer, and/or any combination of elements suitable for determining user intent and causing flow management events.

In one embodiment, context database 230 may comprise a system, device, or apparatus generally operable to store contextual input associated with a user of information handling system 100. In one embodiment, the contextual input may be captured by monitoring devices 180. Specifically, contextual input stored in context database 230 may be or include one or more images captured by image sensor 200, an audio stream captured by audio sensor 220, and/or a proximity signal captured by proximity sensor 210. In another embodiment, the contextual input may be or include telemetry data associated with information handling system 100. For example, contextual input may be or include active foreground/background applications executing on information handling system 100, calendar events for meetings as indicated in an email application, a time of day, I/O activity such as that of a keyboard and/or mouse of information handling system 100, a location of information handling system 100 within an office environment, system settings of information handling system 100, and the like. In one embodiment, contextual input stored in context database 230 may be used as training data for a machine-learned model to generate a configuration policy specific to a user. The configuration policy for a user may indicate various values for adjustable thresholds associated with user intent. For example, a configuration policy may indicate a threshold margin in which a user's gaze may deviate while in a flow state, a threshold time period in which a user's gaze may deviate while in a flow state, and/or a threshold proximity in which a user may be located in relation to information handling system 100 while in a flow state. In one embodiment, the configuration policy for the user may be stored in context database 230 such that rules engine 190 may access the configuration policy and use the configuration policy, in part, to determine user intent. In addition, rules engine 190 may use the various values indicated in the configuration policy of a user to cause flow management events that promote the user being in a flow state. For example, a configuration policy for a given user may indicate that a speaker volume is consistently set to a particular level when the given user is in the flow state. Rules engine 190 may identify the particular level associated with the flow state in the configuration policy for the given user and cause a flow management event to occur that automatically adjusts the speaker volume to the particular level, thereby promoting a flow state for the user.

In one embodiment, rules engine 190 may access one or more images captured by image sensor 200 to determine a user intent of the user. In particular, rules engine 190 may use the one or more images captured by image sensor 200, in part, as contextual input to determine whether the user is in the flow state or in the distracted state. In one embodiment, if the one or more images captured by image sensor 200 show the user to be seated in front of information handling system 100 wearing a headset, rules engine 190 may determine that the user is in the flow state while participating in a teleconference meeting. However, if the one or more images captured by image sensor 200 show the user to be away from the workspace, or the area surrounding information handling system 100, rules engine 190 may determine that the user is in the distracted state while not focused on an immediate task. In another embodiment, if the one or more images captured by image sensor 200 show consistent hand movement of the user, rules engine 190 may determine that the user is in the flow state while typing, for example, a document or email. In contrast, if the one or more images captured by image sensor 200 show the hand movements of the user to be random and/or irregular, focus engine may determine that the user is in the distracted state, for example, while in conversation with a boss or coworker. In one embodiment, rules engine 190 may utilize facial recognition and/or eye-tracking capabilities of image sensor 200 as contextual input to determine a user intent of a user. For instance, if the one or more images captured by image sensor 200 show the user to be seated in front of information handling system 100, rules engine 190 may additionally determine if a gaze of the user is directed toward or away from information handling system 100. If the gaze of the user is directed toward information handling system 100, rules engine 190 may determine that the user is in the flow state. Specifically, if the gaze of the user is directed toward information handling system 100 (e.g., toward a display of information handling system 100) and the gaze of the user does not stray beyond a threshold margin, rules engine 190 may determine that the user is in the flow state. In contrast, if the gaze of the user is directed away from information handling system 100 (e.g., while addressing a nearby coworker, talking on the phone, and the like) above a threshold period of time (e.g., 10 seconds), rules engine 190 may determine that the user is in the distracted state.

In one embodiment, rules engine 190 may determine a collective user intent for a user and one or more additional users. For example, if a gaze of the user is directed toward information handling system 100 and one or more additional users approach information handling system 100 to join the user in a conference meeting, rules engine 190 may determine if a collective gaze of the user and the one or more additional users is directed toward or away from information handling system 100. If the collective gaze is directed toward information handling system 100 and the collective gaze does not stray beyond a collective threshold margin, rules engine 190 may determine that the user and the one or more additional users are in the flow state. Conversely, if the collective gaze of the user or any of the one or more additional users is directed away from information handling system 100 above a threshold period of time, rules engine 190 may determine that the user and the one or more additional users are in the distracted state.

In one embodiment, rules engine 190 may access an audio stream captured by audio sensor 220 to determine a user intent of the user. Specifically, rules engine 190 may use the audio stream captured by audio sensor 220 as contextual input to determine whether the user is in the flow state or in the distracted state. For example, if a user is seated in front of information handling system 100, audio sensor 220 may capture an audio stream of the user working, such as sounds of the user typing on a keyboard and/or participating in a conference call via audio sensor 220. Upon identifying that the user is working, rules engine 190 may determine that the user is in the flow state. In contrast, if the user leaves the area surrounding information handling system 100, the audio stream captured by audio sensor 220 may include ambient sounds of the environment of the user and/or the sounds of an empty room. Upon determining that the user is not within the area surrounding information handling system 100, rules engine 190 may determine that the user is in the distracted state. In addition, if information handling system 100 is experiencing a poor connection quality, an audio stream captured by audio sensor 220 may include an ambient noise that may cause the user to be in a distracted state. Rules engine 190 may access the audio steam captured by audio sensor 220, determine that the audio stream includes an ambient noise causing the user to be in the distracted state, and cause the user intent associated with the user to indicate that the user is in the distracted state. In contrast, if rules engine 190 determines that the audio stream does not include the ambient noise causing the user to be in the distracted state, rules engine 190 may cause the user intent associated with the user to indicate that the user is in the flow state. In one embodiment, rules engine 190 may use the contextual input captured by audio sensor 220 in conjunction with contextual input captured by other monitoring devices 180 of information handling system 100. For example, upon identifying that the audio stream captured by audio sensor 220 includes the sounds of an empty room, rules engine 190 may additionally use one or more images captured by image sensor 200 as contextual input to confirm that the room is in fact empty.

In one embodiment, rules engine 190 may access a proximity signal captured by proximity sensor 210 to determine a user intent of the user. In particular, rules engine 190 may use the proximity signal as contextual input to determine whether the user is in the flow state or in the distracted state. For example, if the proximity signal captured by proximity sensor 210 indicates that a user is within a threshold proximity to information handling system 100, rules engine 190 may determine that the user is working on an immediate task and is in the flow state. In contrast, if the proximity signal captured by proximity sensor 210 indicates that the user is not within the threshold proximity to information handling system 100, rules engine 190 may determine that the user is not working on an immediate task and is in the distracted state. In one embodiment, rules engine 190 may use the contextual input captured by proximity sensor 210 in conjunction with contextual input captured by other monitoring devices 180 of information handling system 100. For example, upon identifying that the proximity signal captured by proximity sensor 210 indicates that the user is within the threshold proximity to information handling system 100, focus engine may additionally use one or more images captured by image sensor 200 as contextual input to confirm that the user is seated in front of information handling system and that the gaze of the user is directed toward information handling system 100.

In one embodiment, rules engine 190 may use hysteresis while monitoring contextual input captured by monitoring devices 180 to determine user intent as described above. In particular, rules engine 190 may determine a length of time, or "hysteresis period," to monitor the contextual input associated with the user. In one embodiment, hysteresis periods may be determined based on a machine-learned model that uses contextual input associated with the user as training data and may be included in a configuration policy specific to the user. Hysteresis periods may be overlapping such that user intent may be determined based on a summation, or average, of contextual input captured within a given monitoring period. For example, if rules engine 190 monitors images of a user captured by image sensor 200 for a total of 10 minutes, rules engine 190 may partition the 10-minute monitoring period into overlapping 3-minute hysteresis periods. Here, each hysteresis period may overlap with the previous hysteresis period. For example, the first 3-minute hysteresis period may monitor a gaze of the user directed toward a display of information handling system 100. A second 3-minute hysteresis period may begin one minute before the end of the first 3-minute hysteresis period (i.e., overlapping the first 3-minute hysteresis period by one minute) and may capture the gaze of the user directed away from the display of information handling system 100 during the last two minutes of the second 3-minute hysteresis period. A third 3-minute hysteresis period may begin one minute before the end of the second 3-minute hysteresis period (i.e., overlapping the second 3-minute hysteresis period by one minute) and may capture the gaze of the user directed away from the display of information handling system 100 during the first minute and directed toward the display during the remaining two minutes of the third 3-minute hysteresis period.

The process described in the example above may continue until the 10-minute monitoring period is complete. Once the monitoring period is complete, rules engine 190 may average an amount of time the gaze of the user was directed toward the display (e.g., within a threshold margin of gaze deviation) and an amount of time the gaze of the user was directed away from the display (e.g., beyond the threshold margin of gaze deviation) across hysteresis periods to determine a user intent. Specifically, if the gaze of the user was directed toward the display for a majority of time (e.g., a larger percentage of time) across hysteresis periods, rules engine 190 may determine that the user intent indicates that the user is, or intends to be, in a flow state. Conversely, if the gaze of the user was directed away from the display for a majority of time (e.g., a larger percentage of time) across hysteresis periods, rules engine 190 may determine that the user intent indicates that the user is in a distracted state. In this way, rules engine 190 may ensure that slight deviations of a user's attention do not result in a change of user intent, thereby allowing the user to briefly rest or take breaks without indicating that the user is in a distracted state. In one embodiment, hysteresis periods may be based on contextual input captured by monitoring devices 180. In another embodiment, hysteresis periods may be based on contextual input inferred from telemetry data associated with information handling system 100. In other embodiments, hysteresis periods may be based on a configuration policy associated with a user, an adjustable threshold defined by an administrator, and/or any suitable combination thereof.

In one embodiment, rules engine 190 may determine a hysteresis period based on a combination of contextual input captured by monitoring devices 180 (e.g., such as one or more images of the user, an audio stream of the user, and/or a proximity signal) and contextual input stored in context database 230 (e.g., such as telemetry data and/or a configuration policy associated with the user). For example, rules engine 190 may determine that a user is typing an email in a cubicle based on one or more images of the user seated in front of information handling system 100, keyboard activity, and an active messaging application executing in the foreground of information handling system 100. Based on the determination of a user activity and location within the office environment, rules engine 190 may determine a hysteresis period to apply while monitoring contextual input captured by monitoring devices 180. In one embodiment, rules engine 190 may designate longer hysteresis periods (e.g., 5 minutes or greater) for periods of user inactivity and shorter hysteresis periods (e.g., 3 minutes or fewer) for periods in which the user is actively working to complete one or more immediate tasks. For instance, rules engine 190 may designate a hysteresis period of 3 minutes while monitoring the user typing the email to ensure that the hysteresis periods correspond to the overall length of time the user typically takes to complete an email in the user's cubicle (e.g., as provided in the configuration policy of the user). However, rules engine 190 may designate a longer hysteresis period while monitoring the user typing the email in a location other than the user's cubicle that may include additional distractions (e.g., a coffee shop, a home office, and the like) resulting in increased time taken to draft the email and/or increased gaze deviation. In another example, rules engine 190 may determine that a user is browsing a news website based on an active webpage in the foreground of a web browser executing on information handling system 100. Here, rules engine 190 may designate a hysteresis period of 5 minutes while monitoring the user browsing the news website regardless of location given that the user typically spends a greater period of time browsing a website than completing an email. In both examples described above, rules engine 190 may determine a user intent based on contextual input captured by monitoring devices 180 within the designated hysteresis periods.

In one embodiment, priority driver 240 may comprise a system, device, or apparatus generally operable to perform bandwidth management and prioritize network traffic for information handling system 100. In particular, priority driver 240 may assign priorities, or "initial priority statuses," to various applications executing on information handling system 100 based on a typical workload for each application. Each initial priority status may indicate a priority in which an application is to be executed by information handling system 100. For example, priority driver 240 may assign an initial priority status of "1" to a video conferencing application that requires low latency such that the video conferencing application may be allocated a large portion of limited bandwidth over other applications executing on information handling system 100. In another example, priority driver 240 may assign a lower initial priority status of "4" to a downloading file which requires bandwidth but is not latency dependent. By assigning initial priority statuses to various applications, priority driver 240 can manage limited resources, for example, such as bandwidth on a transmission line from a network router. In one embodiment, respective initial priority statuses associated with applications executing on information handling system 100 may be stored in priority database 250.

In addition, priority driver 240 may identify one or more access points, or "initial access points," that allow information handling system 100 to become communicatively coupled to a network (e.g., network 110). Specifically, priority driver 240 may identify an initial access point for a given application based on the initial priority status of the given application and static input received from the network indicating a bandwidth or signal strength that may accommodate the workload of the given application. In one embodiment, priority driver 240 may assign a score to each initial access point based on the static input received from the network. For example, priority driver 240 may assign a score of "1" to a given initial access point that may accommodate the workload of a given application having an initial priority status of "1." In another example, priority driver 240 may assign a score of "4" to a given initial access point that may not accommodate the workload of the given application having the initial priority status of "1." In this way, priority driver 240 prioritizes network traffic by applying the best prioritization of known applications to the best choice network connections. In one embodiment, respective initial access points associated with the network, or networks, of computing system 195 may be stored in priority database 250.

In one embodiment, priority database 250 may comprise a system, device, or apparatus generally operable to store initial priority statuses of various applications executing on information handling system 100. Specifically, priority database 250 may be or include a data structure (e.g., queue, stack, and the like) in which each executing application is represented as an element in the data structure and associated with an initial priority status. In addition, each initial access point of the network, or networks, of computing system 195 may be represented as an element in the data structure and associated with a score based on static input received from the network as described above.

In one embodiment, a flow management event caused by rules engine 190 may include upgrading and/or downgrading the initial priority status (e.g., stored in priority database 250) associated with a given application executing on information handling system 100. That is, rules engine 190 may upgrade and/or downgrade the initial priority status associated with a given application to further optimize the bandwidth management performed by priority driver 240 for a user that is, or intends to be, in a flow state to promote the user remaining in, or establishing, the flow state. An upgraded initial priority status, or "upgraded priority status," may indicate that a given application is to be executed by information handling system 100 at a higher priority status than the initial priority status assigned by priority driver 240. A downgraded initial priority status, or "downgraded priority status," may indicate that a given application is to be executed at a lower priority than the initial priority status associated by priority driver 240. In one embodiment, rules engine 190 may access contextual input to determine how the given application is being used by the user and upgrade and/or downgrade the initial priority status accordingly. In one embodiment, rules engine 190 may access telemetry data associated with information handling system 100 stored in context database 230 to infer contextual input. In another embodiment, rules engine 190 may monitor contextual input captured by monitoring devices 180. In other embodiments, rules engine 190 may use any suitable combination of contextual input captured by monitoring devices 180 and/or contextual input inferred from telemetry data to determine how a given application is being used by a user.

In one example, a video conferencing application may be executing on information handling system 100 in a listen-only mode while a user is working on other immediate tasks. In this example, the user may be selectively participating in the video conference by switching audio sensor 220 (e.g., a microphone) from a muted state to an unmuted state in response to the user's name occurring in the audio stream. Here, the user may not require full network priority (e.g., an initial priority status of "1") to be assigned to the video conferencing application except when actively speaking or participating in the video conference. Therefore, rules engine 190 may access telemetry data (e.g., stored in context database 230) associated with information handling system 100 to determine that the user is selectively participating in the video conference by muting and unmuting audio sensor 220, and may downgrade the initial priority status assigned to the video conferencing application to further optimize bandwidth management for other applications executing on information handling system 100.

In another example, a user may be downloading a large file while working on other immediate tasks. Although the downloading file is not latency dependent (e.g., assigned an initial priority status of "4"), a delay in receiving the file may result in the user becoming distracted while waiting for the file to download causing the user to be in the distracted state. Similar to the example above, rules engine 190 may access telemetry data associated with information handling system 100 to identify an active file downloading application executing in the foreground of information handling system 100 and may determine that the user is actively waiting for the file to download. Upon determining that the user is actively waiting for the file to download, rules engine 190 may upgrade the initial priority status assigned to the file downloading application. Thus, by using contextual input associated with a user to upgrade and/or downgrade the initial priority status associated with a given application, rules engine 190 may avoid a potential mismatch from occurring in which network resources are managed according to expected requirements of the applications rather than accounting for how the applications are being used by the user.

In one embodiment, a flow management event caused by rules engine 190 may include upgrading and/or downgrading the initial access point (e.g., stored in priority database 250) associated with a given application executing on information handling system 100. That is, rules engine 190 may upgrade and/or downgrade the initial access point associated with a given application to further optimize the network connection performed by priority driver 240 for a user that is, or intends to be, in a flow state to promote the user remaining in, or establishing, the flow state. An upgraded initial access point, or "upgraded access point," may have a higher quality of service (QoS) than the initial access point. A downgraded initial access point, or "downgraded access point," may have a lower QoS than the initial access point. In one embodiment, rules engine 190 may access contextual input to determine how the given application is being used by the user and upgrade and/or downgrade the initial access point accordingly. In one embodiment, rules engine 190 may access telemetry data associated with information handling system 100 stored in context database 230 to infer contextual input. In another embodiment, rules engine 190 may monitor contextual input captured by monitoring devices 180. In other embodiments, rules engine 190 may use any suitable combination of contextual input captured by monitoring devices 180 and/or contextual input inferred from telemetry data to determine how a given application is being used by a user.

In one embodiment, a flow management event caused by rules engine 190 may include refraining from upgrading and/or downgrading the initial access point associated with a given application executing on information handling system 100. In particular, rules engine 190 may refrain from upgrading and/or downgrading the initial access point associated with a given application such that a user that is, or intends to be, in a flow state may remain in, or establish, the flow state. In the example described above, a user may be selectively participating in a video conference by switching audio sensor 220 from a muted state to an unmuted state in response to the user's name occurring in the audio stream. The user may not require full network priority to be assigned to the video conferencing application except when actively speaking or participating in the video conference, and a downgraded access point may be warranted. However, in this instance, switching the initial access point associated with the video conferencing application to a downgraded access point while the video conference is occurring may result in temporary interference for the user while information handling system 100 switches access points in the network. This temporary interference may cause the user to become distracted while waiting for the switched access points causing the user to be in the distracted state. Therefore, although upgrading and/or downgrading the initial access point associated with a given application executing on information handling system 100 may be warranted, rules engine 190 may refrain from upgrading and/or downgrading the initial access point for circumstances in which doing so may cause a distraction causing the user to be in the distracted state.

In one embodiment, a flow management event caused by rules engine 190 may include causing information handling system 100 to refrain from entering a standby mode. Specifically, rules engine 190 may cause information handling system 100 to refrain from entering a standby mode during transitions of user/system context for a user that is, or intends to be, in a flow state to promote the user remaining in, or establishing, the flow state. Here, the standby mode of information handling system 100 may cause information handling system 100 to be in a locked state to minimize power consumption, thus preventing the user from using information handling system 100. Additionally, the standby mode may be associated with a time required for information handling system 100 to transition from an active state (e.g., in use by a user) to a locked state, and a time required for information handling system 100 to transition from the locked state to the active state. Because the user may be prevented from using information handling system 100 during these times required for transition between active state and locked state, the user may become distracted while waiting for each transition to complete causing the user to be in the distracted state. Furthermore, the transition between active state and locked state may cause the user to be delayed in joining, or otherwise participating, in an immediate task as the user waits for each transition to complete. Therefore, rules engine 190 may access contextual input to determine whether standby mode should be overridden or whether information handling system 100 should enter standby mode to minimize power consumption. In one embodiment, rules engine 190 may access telemetry data associated with information handling system 100 stored in context database 230 to infer contextual input. In another embodiment, rules engine 190 may monitor contextual input captured by monitoring devices 180. In other embodiments, rules engine 190 may use any suitable combination of contextual input captured by monitoring devices 180 and/or contextual input inferred from telemetry data to determine whether standby mode should be overridden.

In one embodiment, rules engine 190 may access telemetry data stored in context database 230 to infer contextual input and determine whether standby mode should be overridden. For example, inferred contextual input may be or include active foreground/background applications executing on information handling system 100, calendar events for meetings as indicated in an email application, a time of day, I/O activity such as that of a keyboard and/or mouse of information handling system 100, a location of information handling system 100 within an office environment, system settings of information handling system 100, DC runtime associated with a battery of information handling system 100, a time required for information handling system 100 to transition from an active state to a locked state, a time required for information handling system 100 to transition from the locked state to the active state, a lid posture and/or hinge angle of information handling system 100, and the like. In another embodiment, rules engine 190 may access contextual input captured by monitoring devices 180 to determine whether standby mode should be overridden. For example, captured contextual input may be or include one or more images captured by image sensor 200, an audio stream captured by audio sensor 220, a proximity signal captured by proximity sensor 210, an ambient light and/or color temperature associated with the environment of the user captured by image sensor 200, and the like. In one embodiment, contextual input stored in context database 230 may be used as training data for a machine-learned model to generate one or more standby thresholds for a user and/or system settings of information handling system 100. Here, rules engine 190 may use the one or more standby thresholds to determine whether standby mode should be overridden. In one embodiment, the one or more standby thresholds may be included in a configuration policy specific to the user and stored in context database 230.

In one example, a user has finished a meeting in a conference room of an office environment and has closed the lid of information handling system 100. The user has a subsequent video conference scheduled to begin two minutes after the finished meeting where the user will participate from the user's cubicle. Here, rules engine 190 may access an email application executing on information handling system 100 to identify calendar events for the meetings and determine that the user is undergoing back-to-back meetings requiring that the user be ready for the video conference as soon as possible. In addition, rules engine 190 may access a standby threshold included in a machine-learned configuration policy associated with the user indicating that the user typically participates in video conferences from the user's cubicle where the user docks information handling system 100 to a docking station providing AC power. In this example, rules engine 190 may determine that the standby mode of information handling system 100 should be overridden, in part, because the transition between active state and locked state may cause the user to be delayed in joining, or otherwise participating, in the subsequent video conference. In addition, rules engine 190 may determine that the standby mode should be overridden based on the standby threshold included in the machine-learned configuration policy indicating that the user typically docks information handling system 100 to a docking station during video conferences.

In another example, a user has finished a meeting in a conference room of an office environment at 11:59 am and has closed the lid of information handling system 100. The user has a subsequent meeting scheduled for 1:00 pm in a different conference room of the office environment after returning from lunch. Prior to leaving for lunch, the user places information handling system 100 in the user's cubicle where it remains undocked and consuming DC power provided by a battery of information handling system 100. Here, rules engine 190 may access an email application executing on information handling system 100 to identify calendar events for the meetings in relation to a current time of day and determine that the next scheduled meeting will take place in roughly one hour (i.e., 1 pm). In addition, rules engine 190 may access a standby threshold included in a machine-learned configuration policy associated with the user indicating that the user typically docks information handling system 100 to a docking station providing AC power at 5:00 pm each day thus allowing information handling system 100 to consume DC power provided by the battery throughout the day. Rules engine 190 may additionally access contextual input captured by monitoring devices 180 to determine that the user is in fact away from information handling system 100 during lunch. In this example, rules engine 190 may determine that the standby mode of information handling system 100 should not be overridden, in part, because the transition between active state and locked state may not prevent the user from joining, or otherwise participating, in the subsequent meeting scheduled for 1:00 pm. In addition, rules engine 190 may determine that the standby mode should not be overridden based on the standby threshold included in the machine-learned configuration policy and contextual input captured by monitoring devices 180.

FIG. 3 is a flowchart depicting selected elements of an embodiment of a method for managing a flow state of a user of an information handling system. It is noted that certain operations described in method 300 may be optional or may be rearranged in different embodiments.

Method 300 may begin at step 310, where rules engine 190 may receive contextual input associated with a user. In one embodiment, the contextual input associated with a user may be inferred from telemetry data stored in context database 230. For example, inferred contextual input may be or include active foreground/background applications executing on information handling system 100, calendar events for meetings as indicated in an email application, a time of day, I/O activity such as that of a keyboard and/or mouse of information handling system 100, a location of information handling system 100 within an office environment, system settings of information handling system 100, DC runtime associated with a battery of information handling system 100, a time required for information handling system 100 to transition from an active state to a locked state, a time required for information handling system 100 to transition from the locked state to the active state, a lid posture and/or hinge angle of information handling system 100, and the like. In another embodiment, contextual input associated with a user may be captured by monitoring devices 180. For example, captured contextual input may be or include one or more images captured by image sensor 200, an audio stream captured by audio sensor 220, a proximity signal captured by proximity sensor 210, an ambient light and/or color temperature associated with the environment of the user captured by image sensor 200, and the like. In step 320, rules engine may determine a user intent associated with the user based on the contextual input. The user intent indicates whether the user intends to be in the flow state or in a distracted state. In one embodiment, rules engine 190 may use hysteresis while monitoring contextual input captured by monitoring devices 180 to determine user intent. In step 330, rules engine 190 may identify that the user intends to be in the flow state based on the user intent. For example, if the gaze of the user is directed toward information handling system 100 (e.g., toward a display of information handling system 100) and the gaze of the user does not stray beyond a threshold margin, rules engine 190 may determine that the user is, or intends to be, in the flow state. In step 340, rules engine 190 may cause a flow management event to occur causing the user to be in the flow state. For example, rules engine 190 may cause flow management events that upgrade and/or downgrade the initial priority status of an application executing on information handling system 100, upgrade and/or downgrade the initial access point associated with an application executing on information handling system 100, and/or cause information handling system 100 to refrain from entering a standby mode.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for managing a flow state of a user of an information handling system having a keyboard, the method comprising:

receiving, by a rules engine of the information handling system, contextual input associated with the user, the contextual input comprising a proximity of the user relative to the information handling system and one or more of a direction of a gaze of the user, an indication of typing on the keyboard and audio information captured by one or more monitoring devices of the information handling system;

identifying a plurality of applications executing on the information handling system;

determining, based on the contextual input, a user intent associated with the user, the user intent indicating whether the user intends to be in the flow state or in a distracted state;

determining, based on the user intent, that the user intends to be in the flow state; and in response to determining that the user intends to be in the flow state:

causing a flow management event to occur, the flow management event comprising determining a priority status for each application of the plurality of applications, the priority status indicating a priority in which the application is to be executed by the information handling system; and causing the information handling system to perform one or more of upgrading the priority status of a first application of the plurality of applications, wherein the first application is associated with the user being in the flow state and an upgraded priority status indicates that the first application is to be executed at a higher priority than an initial priority status, downgrading the priority status of a second application of the plurality of applications, wherein the second application is not associated with the user being in the flow state and the downgraded priority status indicating that the application is to be executed at a lower priority than the initial priority status, and upgrading an access point to a network to have a higher quality of service; and one or more of executing the first application based on the upgraded priority status and accessing the network using the upgraded access point.

2. The method of claim 1, wherein determining the user intent associated with the user comprises:

determining, by the rules engine, a hysteresis period based on the contextual input associated with the user, the hysteresis period indicating a length of time in which the rules engine is to monitor the contextual input associated with the user;

monitoring the contextual input associated with the user based on the hysteresis period.

3. The method of claim 1, wherein determining the user intent associated with the user comprises:

accessing, by the rules engine, one or more images of the user captured by an image sensor of the information handling system;
determining whether a gaze of the user is directed toward a display of the information handling system; and
determining the user is in the flow state if the gaze of the user is directed toward the display of the information handling system or determining the user is in the distracted state if the gaze of the user is directed away from the display of the information handling system.

4. The method of claim 3, wherein determining the user intent associated with the user comprises:
accessing, by the rules engine, an audio stream captured by an audio sensor of the information handling system;
determining that the audio stream includes an ambient noise;
determining that the audio stream does not include a sound of typing on the keyboard of the information handling system;
accessing, by the rules engine, a proximity signal captured by a proximity sensor of the information handling system;
determining, based on the proximity signal, whether the user is within a proximity threshold of the information handling system; and
determining the user is in the flow state if the user is within a proximity threshold of the information handling system or determining the user is in the distracted state if the user is outside of the proximity threshold of the information handling system and the gaze of the user is directed away from the display of the information handling system.

5. The method of claim 4, further comprising:
determining, based on the gaze of the user, the user is using the first application of the plurality of applications executing on the information handling system; and
determining the user is in the flow state if the gaze of the user is directed toward the first application executing on the information handling system or determining the user is in the distracted state if the gaze of the user is away from the first application executing on the information handling system.

6. The method of claim 1, wherein causing the flow management event to occur comprises:
accessing, by the rules engine, a context database of the information handling system, the context database comprised of the contextual input associated with the user;
determining, based on the contextual input, that a standby mode of the information handling system should be overridden, the standby mode causing the information handling system to be in a locked state, the locked state preventing the user from using the information handling system; and
in response to determining that the standby mode of the information handling system should be overridden, overriding the standby mode to prevent the information handling system from being in the locked state.

7. The method of claim 1, wherein causing the flow management event to occur comprises:
accessing the contextual input captured by the one or more monitoring devices of the information handling system;
determining, based on the contextual input, whether the initial priority status for each application of the plurality of applications should be upgraded or downgraded, an upgraded priority status indicating that the application is to be executed at a higher priority than the initial priority status, a downgraded priority status indicating that the application is to be executed at a lower priority than the initial priority status; and
executing the plurality of applications based on at least one of the initial priority status, the upgraded priority status, or the downgraded priority status of each application.

8. The method of claim 1, wherein causing the flow management event to occur comprises:
identifying, by the rules engine, a plurality of access points in a network;
selecting an initial access point from the plurality of access points, the initial access point allowing the information handling system to become communicatively coupled to the network;
accessing the contextual input captured by the one or more monitoring devices of the information handling system;
determining, based on the contextual input, whether the initial access point should be upgraded or downgraded, an upgraded access point having a higher quality of service than the initial access point, a downgraded access point having a lower quality of service than the initial access point; and
causing the information handling system to become communicatively coupled to the network using at least one of the initial access point or the upgraded access point.

9. An information handling system, comprising:
at least one processor;
a keyboard;
one or more monitoring devices; and
a memory medium that is coupled to the at least one processor and that includes instructions that are executable by the at least one processor, wherein the instructions, when executed by the at least one processor, cause the information handling system to:
receive, by a rules engine, contextual input associated with the user, the contextual input comprising proximity of the user relative to the information handling system and one or more of a direction of a gaze of the user, an indication of typing on the keyboard and audio information captured by the one or more monitoring devices of the information handling system;
identify a plurality of applications executing on the information handling system;
determine, based on the contextual input, a user intent associated with the user, the user intent indicating whether the user intends to be in a flow state or in a distracted state;
determine, based on the user intent, that the user intends to be in the flow state; and
in response to determining that the user intends to be in the flow state:
cause a flow management event to occur, the flow management event causing the information handling system to:
causing the information handling system to determine a priority status for each application of the plurality of applications, the priority status indicating a priority in which each application is to be executed by the information handling system; and
perform one or more of upgrade the priority status of a first application of the plurality of applications, wherein the first application is associated with the user being in the flow state and an upgraded priority status indicates that the first application is to be executed at a higher priority than an initial priority status, downgrade the priority status of a second application of the plurality of applications, wherein the second application is not associated with the user being in the flow state and the downgraded priority status indicating that the application is to be executed at a lower priority than the initial priority status, and upgrade an access point to a network to have a higher quality of service; and one or more of execute the first application based on the upgraded priority status and access the network using the upgraded access point.

10. The information handling system of claim 9, wherein to determine the user intent associated with the user, the instructions, when executed by the at least one processor, are further configured to:

determine a hysteresis period based on the contextual input associated with the user, the hysteresis period indicating a length of time in which the rules engine is to monitor the contextual input associated with the user;

monitor the contextual input associated with the user based on the hysteresis period.

11. The information handling system of claim 9, wherein to determine the user intent associated with the user, the instructions, when executed by the at least one processor, are further configured to:

access one or more images of the user captured by an image sensor of the information handling system;

determine whether the gaze of the user is directed toward a display of the information handling system; and determine the user is in the flow state if the gaze of the user is directed toward the display of the information handling system or determine the user is in the distracted state if the gaze of the user is directed away from the display of the information handling system.

12. The information handling system of claim 11, wherein to determine the user intent associated with the user, the instructions, when executed by the at least one processor, are further configured to:

access an audio stream captured by an audio sensor of the information handling system;

determine that the audio stream includes an ambient noise; and determine that the audio stream does not include a sound of typing on the keyboard of the information handling system;

access, by the rules engine, a proximity signal captured by a proximity sensor of the information handling system;

determine, based on the proximity signal, whether the user is within a proximity threshold of the information handling system; and determine if the user is within a proximity threshold of the information handling system or determine the user is in the distracted state if the user is outside of the proximity threshold of the information handling system and the gaze of the user is directed away from the display of the information handling system.

13. The information handling system of claim 12, wherein the instructions, when executed by the at least one processor, are further configured to:

determine, based on the gaze of the user, the user is using the first application executing on the information handling system; and determine the user is in the flow state if the gaze of the user is directed toward the first application executing on the information handling system or determine the user is in the distracted state if the gaze of the user is away from the first application executing on the information handling system.

14. The information handling system of claim 9, wherein to cause the flow management event to occur, the instructions, when executed by the at least one processor, are further configured to:

access a context database of the information handling system, the context database comprised of the contextual input associated with the user;

determine, based on the contextual input, that a standby mode of the information handling system should be overridden, the standby mode causing the information handling system to be in a locked state, the locked state preventing the user from using the information handling system; and in response to determining that the standby mode of the information handling system should be overridden, overriding the standby mode to prevent the information handling system from being in the locked state.

15. The information handling system of claim 9, wherein to cause the flow management event to occur, the instructions, when executed by the at least one processor, are further configured to:

access the contextual input captured by the one or more monitoring devices of the information handling system;

determine, based on the contextual input, whether the initial priority status for each application of the plurality of applications should be upgraded or downgraded, an upgraded priority status indicating that the application is to be executed at a higher priority than the initial priority status, a downgraded priority status indicating that the application is to be executed at a lower priority than the initial priority status; and execute the plurality of applications based on at least one of the initial priority status, the upgraded priority status, or the downgraded priority status of each application.

16. The information handling system of claim 9, wherein to cause the flow management event to occur, the instructions, when executed by the at least one processor, are further configured to:

identify a plurality of access points in a network;

select an initial access point from the plurality of access points, the initial access point allowing the information handling system to become communicatively coupled to the network;

access the contextual input captured by the one or more monitoring devices of the information handling system;

determine, based on the contextual input, whether the initial access point should be upgraded or downgraded, an upgraded access point having a higher quality of service than the initial access point, a downgraded access point having a lower quality of service than the initial access point; and cause the information handling system to become communicatively coupled to the network using at least one of the initial access point or the upgraded access point.

* * * * *